Oct. 20, 1936.  J. T. CALLAHAN  2,057,878
ELECTRIC COOKING DEVICE
Filed July 31, 1934
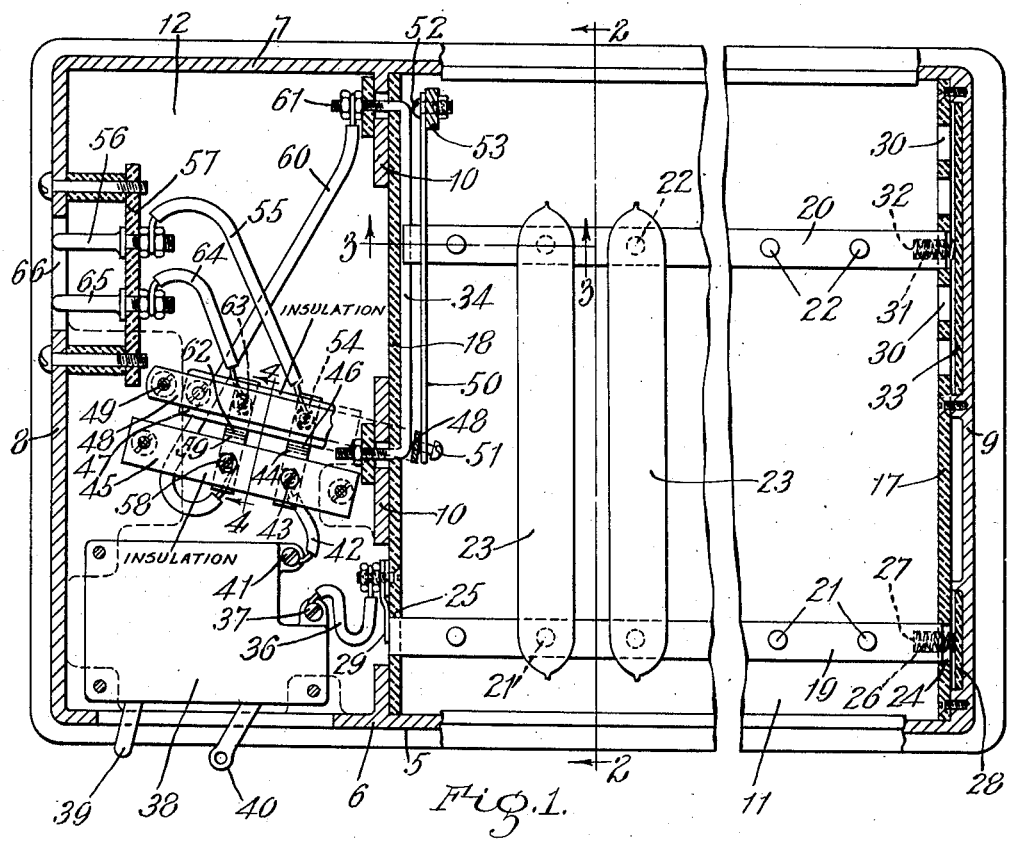
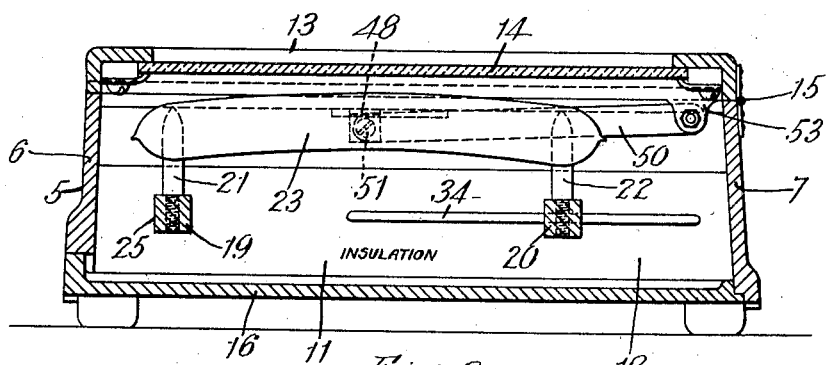
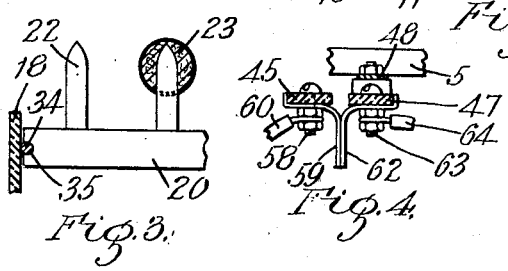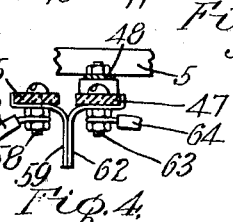
Inventor:
James T. Callahan.
by Franklin E. Low
Atty.

Patented Oct. 20, 1936

2,057,878

UNITED STATES PATENT OFFICE 2,057,878

ELECTRIC COOKING DEVICE

James T. Callahan, Allston, Mass., assignor to Walter B. Bowser, Newton Highlands, Mass.

Application July 31, 1934, Serial No. 737,756

3 Claims. (Cl. 219—19)

This invention relates to an improvement in cooking devices and particularly to a device for electrically cooking frankforts and the like.

The object of the invention is to provide an electric device of novel construction in which frankforts and like meat products, or plain meats, may be cooked quickly and effectively and in a manner to retain all the natural flavor of the frankforts or meat.

Another object of the invention is to provide a novel means whereby frankforts of different sizes may be supported in close proximity to their ends in order that an electric current passing therethrough will effectively cook the entire frankfort.

Another object of the invention is to provide a novel means whereby an electric switch controlling the electric current to the frankforts may be actuated automatically by the raising and lowering of the cover of the device, said switch always being open when the cover of the device is raised and closed when the cover is lowered, thereby eliminating any hazard there might be from short circuits occurring when the frankforts are attached to or removed from the electrodes.

The device furthermore includes a time switch mechanism, to the end that the cooking operation may be accurately timed.

The invention consists in an electrical cooking device as set forth in the following specification and particularly as pointed out in the claims thereof.

Referring to the drawing:—

Fig. 1 represents a plan view of an electrical cooking device embodying my invention, the cover of the cooking compartment being removed and portions of the casing and mechanism being broken away and illustrated in section, while other portions of the device are broken away to save space in the drawing.

Fig. 2 is a vertical transverse section taken on the line 2—2 of Fig. 1, looking in the direction of the arrows on said line.

Fig. 3 is a detail sectional elevation taken on the line 3—3 of Fig. 1.

Fig. 4 is a detail sectional elevation taken on the line 4—4 of Fig. 1.

Like numerals refer to like parts throughout the several views of the drawing.

In the drawing, 5 represents a casing constructed of metal and comprising a front wall 6, rear wall 7 and end walls 8 and 9. A partition 10 extends transversely across the casing between the front and rear walls and divides the interior of the casing into a cooking compartment 11 and a switch compartment 12. The cooking compartment 11 is provided with a cover 13 having a glass panel 14 embodied therein through which the meat products being cooked are visible and said cover is hinged to the casing 5 at 15. A drip tray 16 is provided for the cooking compartment 11, being mounted to slide in suitable grooves provided therefor in the casing 5 and any drippings from the meats being cooked will drop upon said tray.

Mounted in the cooking compartment 11 and supported upon insulating plates 17 and 18 secured to the end wall 9 and partition 10 respectively are bars 19 and 20 having pins 21 and 22 respectively projecting upwardly therefrom upon which frankforts 23, or similar meats or meat products, may be impaled in close proximity to each extremity thereof. The bars 19 and 20 constitute electric conducting members and form a part of the electric circuit which is utilized as a means for cooking the frankforts or meats and the pins 21 and 22 constitute electrodes, and when the frankforts are impaled thereon the electric current passes from one bar to another through the frankforts.

The bars 19 and 20 are positioned in parallel relation one to another within the compartment 11 and the bar 20 is adjustable relatively to the bar 19 in order that frankforts of different lengths may be impaled in close proximity to their ends upon the pins 21 and 22. The bar 19 is detachably mounted in openings 24 and 25 provided therefor in the insulating plates 17 and 18 respectively and a spring 26 seated in a recess 27 at one end of said bar engages a layer of insulating material 28 inserted in the end wall 9 and acts to maintain the bar in contact with a yielding electric contact member 29 mounted upon the insulating plate 18.

The bar 20 may be inserted in any one of a plurality of openings 30 provided therefor in the insulating plate 17 and a spring 31 seated in a recess 32 at one end of said bar engages a layer of insulating material 33 inserted in the end wall 9 and acts to hold the bar in yielding engagement with a rod 34 constituting an electric conducting member mounted upon the insulating plate 18, said rod forming a part of the electric circuit. The extremity of the bar 20 which engages the rod 34 is grooved at 35, see Fig. 3, and has sliding engagement with said rod 34. When the bar 20 is placed in position in the compartment 11, the end thereof which has the spring 31 seated therein is inserted in one of the openings 30 and said bar is forced into said opening against the tension of the spring 31 until the grooved end of the bar is interlocked with the rod 34 and the bar may be inserted in any one of the openings 30 as required to accommodate the various lengths of frankforts.

The electric conducting member 29 is connected by an electric wire 36 to a terminal 37 of a time switch mechanism 38 mounted in the switch compartment 12 of the casing 5. The mechanism 38 may be of any suitable construction well known in the art and the timing of said mechanism is controlled by a lever 39 and the actuation of the mechanism is controlled by a lever 40. Another terminal 41 for the mechanism 38 is connected by a wire 42 with a terminal 43 for a stationary electric contact member 44 fast to an insulating member 45 mounted in the compartment 12 of the casing 5. The contact member 44 engages a similar contact member 46 mounted upon an insulating member 47 carried by an arm 48 pivotally attached at one end thereof to the casing 5 at 49. The other end of the arm 48 is operatively connected with the cover 13 of the casing 5 by means of a link 50, one end of said link being loosely connected at 51 to the arm 48 and the other end of said link being connected at 52 to a lug 53 which is formed integral with and projects downwardly from the under side of the cover 13. A terminal 54 for the electric contact member 46 is connected by a wire 55 to a terminal 56 mounted upon a suitable insulating member 57 mounted upon the casing 5. A terminal 58 for an electric contact member 59 is mounted upon the insulating member 45 and is connected by a wire 60 to an end 61 of the rod 34. The contact member 59 engages a similar contact member 62 mounted upon the insulating member 47 and a terminal 63 for said contact member 62 is connected by a wire 64 to a terminal 65 mounted upon the insulating member 57. The terminals 56 and 65 are connected in a well-known manner to a suitable source of electric supply, the connection to said terminals being made through an opening 66 provided in the casing 5.

The general operation of the device hereinbefore specifically described is as follows:—Assuming that the bars 19 and 20 have been positioned in the cooking compartment 11 to accommodate the length of frankfort 23 which is to be cooked, frankforts in suitable number are impaled upon the pins 21 and 22 of the bars 19 and 20, said pins penetrating the frankforts adjacent to the extremities of said frankforts. At all times when the frankforts are being attached to or removed from the pins 19 and 20 it is necessary that the cover 13 shall be located in its raised position and at such times all danger of short circuits occurring because of the operator contacting his hands with the pins 21 and 22 or bars 19 and 20 is eliminated on account of the fact that the cover 13 is operatively connected to the arm 48 which carries the electric contact members 46 and 62, and the electric circuit between these contact members and their co-operating contact members 44 and 59 respectively is broken. After the frankforts have been attached to the pins 21 and 22 and the cover 13 has been lowered, if it is desired to time the cooking of the frankforts, the lever 39 of the time switch mechanism 38 is actuated in a well-known manner to set the time and the lever 40 is then actuated to start the switch mechanism 38 in operation. The electric circuit through the device will then be entirely closed and the frankforts will be cooked for the length of time for which the switch mechanism 38 is set, at the end of which period the circuit will automatically be broken at the switch mechanism 38 and the frankforts will stop cooking immediately.

In cooking the frankforts it will be understood that when the electric current passes through the frankforts 23 or other meat a resistance will be set up in a well-known manner to cause heat to be generated within the frankforts and the cooking action will take place from the interior of the frankforts outwardly. This cooking action will be very rapid and effective and all of the natural flavor contained in the frankfort or meat product being cooked will be retained therein.

It is not necessary to utilize the timing portion of the time switch mechanism 38 unless it is so desired, and the electric circuit through this mechanism may be opened and closed at will by operating the lever 40 which controls the switch portion of this mechanism.

I claim:

1. A cooking device of the character described comprising, in combination, a casing, a cover therefor, an electric circuit including an electric switch and a pair of relatively parallel bars mounted in said casing and insulated therefrom, one of said bars being adjustable toward and away from the other bar, a plurality of pins projecting from each of said bars adapted to have frankforts and the like impaled thereon, thereby closing the electric circuit between the bars, all of said pins being spaced simultaneously to receive frankforts of different lengths by changing the position of said adjustable bar relatively to the other bar, and means operatively connecting said cover to said switch whereby the electric circuit through the frankforts may be controlled by the movement of the cover.

2. A cooking device of the character described comprising, in combination, a casing, a cover therefor, an electric circuit including an electric switch and a pair of relatively parallel bars mounted in said casing and insulated therefrom, one of said bars being adjustable toward and away from the other bar, pins projecting from said bars adapted to have frankforts and the like impaled thereon, thereby closing the electric circuit between the bars, means operatively connecting said cover to said switch whereby the electric circuit through the frankforts may be controlled by the movement of the cover, and a time switch mechanism also embodied in said electric circuit and adapted to automatically break said circuit at the end of a predetermined period of time.

3. A cooking device of the character described comprising, in combination, a casing, an electric circuit including an electric switch, an electric conducting member and a pair of bars mounted in said casing and insulated therefrom, said insulation including a member provided with openings therein in which an end of one of said bars is insertable, the other end of said bar having yielding sliding engagement with said electric conducting member whereby the bar is adjustable toward and away from the other bar, and a plurality of pins projecting from said bars and adapted to have frankforts and the like impaled thereon, thereby closing the electric circuit between the bars.

JAMES T. CALLAHAN.